(12) United States Patent
Sethi

(10) Patent No.: US 9,380,226 B2
(45) Date of Patent: Jun. 28, 2016

(54) SYSTEM AND METHOD FOR EXTRACTION OF A DYNAMIC RANGE ZONE IMAGE

(71) Applicant: Toshiba America Electronic Components, Inc., Irvine, CA (US)

(72) Inventor: Rakesh Sethi, Irvine, CA (US)

(73) Assignee: Toshiba America Electronic Components, Inc., Irvine, CA (US)

(*) Notice: Subject to any disclaimer, the term of this patent is extended or adjusted under 35 U.S.C. 154(b) by 39 days.

(21) Appl. No.: 14/296,059

(22) Filed: Jun. 4, 2014

(65) Prior Publication Data

US 2015/0358561 A1 Dec. 10, 2015

(51) Int. Cl.
*H04N 5/345* (2011.01)
*H04N 5/353* (2011.01)
*H04N 5/232* (2006.01)
*H04N 5/355* (2011.01)

(52) U.S. Cl.
CPC ......... *H04N 5/3452* (2013.01); *H04N 5/23241* (2013.01); *H04N 5/355* (2013.01); *H04N 5/3532* (2013.01); *H04N 2209/048* (2013.01)

(58) Field of Classification Search
CPC ... H04N 5/3452; H04N 5/3432; H04N 5/355; H04N 5/52
See application file for complete search history.

(56) References Cited

U.S. PATENT DOCUMENTS

2008/0219583 A1* 9/2008 Deshpande .......... H04N 19/117
382/261
2014/0071131 A1* 3/2014 Kitago ............... H04N 13/0011
345/427

OTHER PUBLICATIONS

Duan et al., "Development of CMOS Image Sensor System based on Chaos Particle Swarm", International Journal of Hybrid Information Technology, vol. 6, No. 6, 2013, pp. 237-248.
Oike et al., "CMOS Image Sensor With Per-Column ADC and Programmable Compressed Sensing", IEEE Journal of Solid-State Circuits, vol. 48, No. 1, Jan. 2013, pp. 318-328.
Ouadfel et al., "Automatic image clustering using a swarm intelligence approach", International Journal of Computer Science Issues, vol. 8, Issue 5, No. 3, Sep. 2011, pp. 294-302.
Panigrahi et al., "Handbook of Swarm Intelligence", Adaptation Learning and Optimization, vol. 8, 2011, pp. 1-556 (copy to be provided).
Zhuang et al., "Advances in Image Analysis—Nature Inspired Methodology", World Scientific and Engineering Academy and Society (WSEAS Press), 2011, pp. 1-120.
Brin et al., "The Anatomy of a Large-Scale Hypertextual Web Search Engine", Computer Science Department, Stanford University, 1998.
Panchal et al., "Swam Intelligence for Mixed Pixel Resolution", Recent Researches in Telecommunications, Informatics, Electronics and Signal Processing, pp. 24-28, 2011.

\* cited by examiner

*Primary Examiner* — Nicholas Giles
(74) *Attorney, Agent, or Firm* — Ulmer & Berne LLP

(57) ABSTRACT

Optimization of image acquisition relative resource usage, particularly power, is accomplished by use of a beehive algorithm, inspired by observation of the way that bees communicate foraging information by a dance. Analysis of relative gain associated with captured pixels facilitates isolation of one or more areas of particular interest for focusing one or more subsequent image capture operations. Selective enablement of picture acquisition elements targeting each isolated area facilitates obtaining images containing needed or useful information while minimizing resource use.

20 Claims, 5 Drawing Sheets

SYSTEM AND METHOD FOR EXTRACTION OF A DYNAMIC RANGE ZONE IMAGE

TECHNICAL FIELD

The subject application includes example embodiments generally to image capturing systems. The application is particularly applicable to conservation of resources during digital image capture.

BACKGROUND

Early capturing and archiving of visible information, such as in static or moving pictures, was completed by exposing a light-sensitive medium to a focused image from a lens or lensing system. Static images were typically captured with a brief exposure period. Moving picture images were typically captured as a series of individual exposures or frames that, when played back in the same order, gave a viewer the appearance of motion.

Today, most images, both still and moving, are captured using arrays of solid state photo sensors, referred to as an active-pixel sensor (APS). The array captured images as an array of individual picture elements, referred to as pixels. In an APS, each image capturing element is associated with one or more photodetectors. For color imaging, elements may themselves be comprised of multiple photodetectors with each being sensitive to a particular range of visible light. By way of example, one detector may be used for respective primary colors to afford a gamut of colors in a captured image.

Digital image sensors a be comprised of CMOS sensors, NMOS sensors, charge-coupled devices (CCDs), thin film transistors, or the like. Early APS devices had fewer components or components that were less densely packed, resulting in relatively limited resolution. Continued advancement in APS design has resulted in images having a very high resolution achieved by very large arrays of photosensors. While increased resolution is advantageous for achieving better images, increasing a number of detectors requires a corresponding increase in power necessary to enable the image capture operation. This power increase can be particularly problematic when image capturing devices are portable or battery powered. Battery drain can be exacerbated when capturing video insofar as the photosensor array may be continuously or frequently enabled to capture a changed image or new frame.

OVERVIEW OF EXAMPLE EMBODIMENTS

Figure 1:
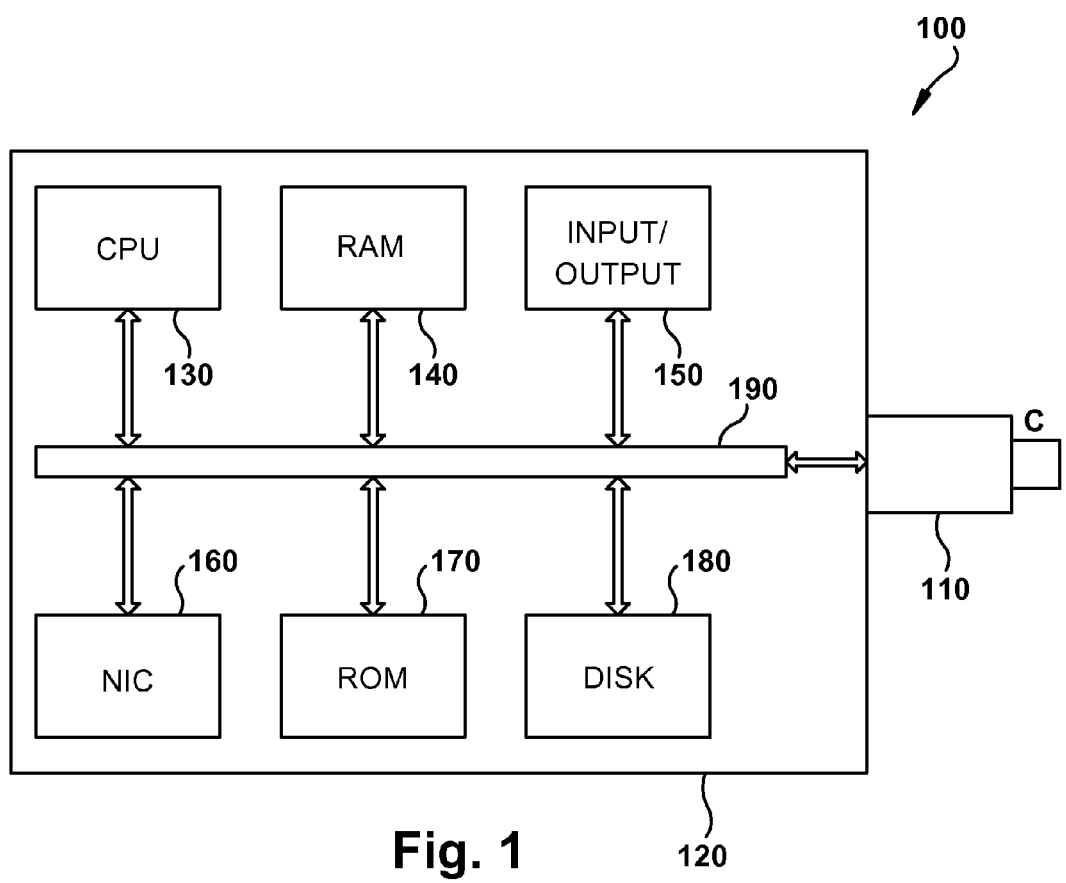
FIG. 1 illustrates an example embodiment of a suitable processing platform.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with example embodiments herein, apparatus and method, comprise an array of optically reactive elements. The array has a control operable to selectively enable elements of the array. An optical input is operable to receive an image on to the array. The reactive elements are operable to generate a signal in accordance with a portion of the image. A digitizer is operable to generate a digital pixel value corresponding to each signal. A memory is operable to store the pixel values. A selector is operable to generate an output in accordance with a comparison of digital values of neighboring pixel and a threshold values, wherein the selector is further operable to generate a control signal to selectively enable elements of the array in accordance with the groupings. The selector is further operable to compare the digital values in accordance with a swarming algorithm. The swarming algorithm is further comprised of a beehive algorithm.

DETAILED DESCRIPTION OF EXAMPLE EMBODIMENTS

Decreasing resolution or size of captured images, decreasing frame rate or capturing in grayscale rather than color or with a more limited color gamut can result in lowered power consumption. However, it is frequently most desirable to have a high resolution image capture with a large color gamut. The subject application teaches example embodiments where application of specialized algorithms facilitates capturing images that are relatively high in resolution, particularly relative to active or important areas within one or more images. Much has been learned about optimization from what has become to be known as the bees algorithm in computer science. Observations made over time on colonies of honey bees lead to a revelation as to how worker bees, functioning as scouts, communicate discovered food locations to other bees in a hive. When a worker bee returns to the hive after successful foraging, it communicates information relative to location and quantity of a food source by performing what is referred to as a waggle dance. Properties of a waggle dance are dictated by the quality of the associated food source. Information relative to a higher quality food source will be acted upon by a greater number of idle worker bees. Given the concurrent efforts of a plurality of scouts, the colony can best marshal its limited resources toward the most productive sources.

By way of example, a suitable bees algorithm is provided below:

The pseudocode for the standard Bees Algorithm

```
1 for i=1,...,ns
    i    scout[i]=Initialise_scout( )
    ii   flower_patch[i]=Initialise_flower_patch(scout[i])
2 do until stopping_condition=TRUE
    i    Recruitment( )
    ii   for i =1,...,nb
         1 flower_patch[i]=Local_search(flower_patch[i])
         2 flower_patch[i]=Site_abandonment(flower_patch[i])
         3 flower_patch[i]=Neighbourhood_shrinking(flower_patch[i])
    iii  for i = nb,...,ns
         1 flower_patch[i]=Global_search(flower_patch[i])}
```

In the initialization routine ns scout bees are randomly placed in the search space. These scouts then evaluate fitness of their solutions where they land. For each solution, a neighborhood (called flower patch) is delimited. During recruitment, the scouts that visited the nb≤ns fittest solutions (best sites) perform the waggle dance. That is, they recruit foragers to search further the neighborhoods of the most promising solutions. The scouts that located the very best ne≤nb solutions (elite sites) recruit nre foragers each, whilst the remaining nb−ne scouts recruit nrb≤nre foragers each. Thus, the number of foragers recruited depends on the profitability of the food source.

In the local search procedure, the recruited foragers are scattered randomly within the flower patches enclosing the solutions visited by the scouts (local exploitation). If any of the foragers in a flower patch lands on a solution of higher fitness than the solution visited by the scout, that forager becomes the new scout. If no forager finds a solution of higher fitness, the size of the flower patch is diminished (neighborhood shrinking procedure). Flower patches are typically defined initially to cover a large area. The size is gradually reduced by the neighborhood shrinking procedure. As a result, the scope of the local exploration is focused progressively on an area immediately close to the local fitness best. If no improvement in fitness is recorded in a given flower patch for a pre-set number of search cycles, a local maximum of fitness is considered found, the patch is abandoned (site abandonment), and a new scout is generated randomly.

As in biological bee colonies, a small number of scouts keeps exploring the solution space looking for new regions of high fitness (global search). The global search procedure re-initializes the last ns−nb flower patches with randomly generated solutions.

At the end of one search cycle, the scout population is again composed of ns scouts: nr scouts produced by the local search procedure (some of which may have been re-initialized by the site abandonment procedure), and ns−nb scouts generated by the global search procedure. The total artificial bee colony size is n=ne·nre+(nb−ne)·nrb+ns (elite sites foragers+remaining best sites foragers+scouts) bees.

Optimization, such as that noted above, is applicable to image acquisition, analogously to a page ranking algorithm used by Google in connection with displaying search results. This equation is suitably represented by:

$$PR(A) = \frac{1-d}{N} + d\left(\frac{PR(B)}{L(B)} + \frac{PR(C)}{L(C)} + \frac{PR(D)}{L(D)} + \ldots\right)$$

In the forgoing equation, there is a presumption that a finite number of selections N will exist. Relative strength L is determined in accordance with neighboring pixels. A probability that continued selections will be available is diminished by a selected dampening factor d. By way of further example, individual captured pixels are suitably evaluated relative to a level of gain. Higher ranking pixels will influence neighboring pixels, and vice versa.

Turning now to FIG. 1, illustrated is example embodiment of an imaging system 100. Included is an image acquisition device such as camera 110. Camera 110 is any suitable APS camera such as those noted above. Associated with camera 110 is a computer 120 suitably comprised of at least one processor, such as CPU 130, random access memory 140, an input/output interface 150, and a network interface 160. Also suitably included is read only memory 170 and mass storage, such as that illustrated by disk 180. Data connection among the portions is suitably accomplished by bus 190. It will be appreciated that the system 100 is suitably comprised of a single unit, such as with a portable camera device operating under battery power. In another example embodiment, some or all of the functionality of computer 120 is suitably accomplished in a separate processing module.

Figure 2:
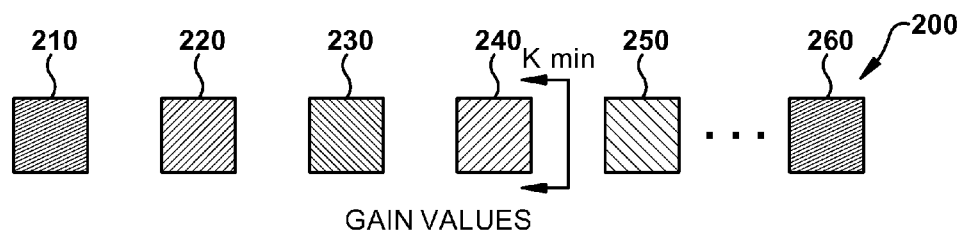
FIG. 2 illustrates an example of gain values in connection with image capture.

Referring now to FIG. 2, illustrated an example embodiment of various gain levels associated with capturing a digital image using an APS. In the illustrated example, gain values associated with different pixel areas of a captured image are represented by pixels 210, 220, 230, 240, 250 and 260. It will be appreciated that the number of gain values in FIG. 2 is for illustrative purposes only and that any suitable differentiation level is suitably used. Particulars associated with gain levels are influenced by hardware capabilities, including sensitivity, dispersion or size of image capturing elements, as well as particular needs for specific image capturing situations.

The gain values of FIG. 2 to are illustrated as black-and-white or grayscale imaging. Capture of color information, such as via capture of primary color components as noted above, are also suitable. As will be detailed further below, application of image acquisition optimization suitably employs a threshold value, suitably $K_{min}$ to decide on which pixels are selected for further processing.

Figure 3:
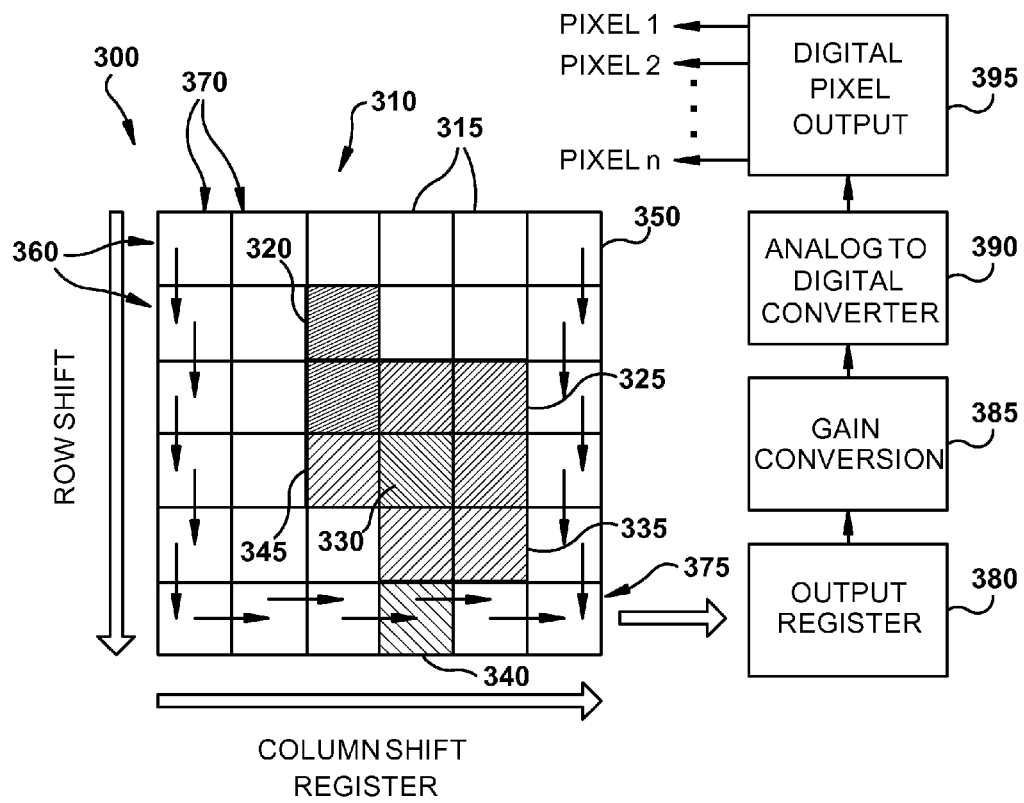
FIG. 3 illustrates an example embodiment of image capture.

Turning now to FIG. 3, illustrated is an example embodiment of a digital image capture system 300. An array 310 of image capture elements or pixels 315 is suitably formed as a rectangular grid. As with FIG. 2, above, grayscale rendering is for illustrative purposes only. Color capture, such as use of multiple arrays using adjacent pixel capture elements targeting complementary spectra are also suitably used.

In the illustration of FIG. 3, array 310 is suitably exposed to an image, such as via a suitable lensing arrangement projecting a real image of a scene, for a finite duration. Thus, pixel capture elements 315 are set with values associated with light levels during the exposure period. The pixel intensity corresponds to gain associated with a captured image element. In the example, pixel area 320 is comprised of two pixels of generally equal gain levels. Equivalence is suitably dictated by camera sensitivity, defined ranges, color levels, or any suitable level definition. In the illustration, pixel areas are shown at 325, 330, 335, 340 and 345. A default level or background level is illustrated at 350. In the example of FIG. 3, pixel area 320 is suitably illustrated at a relatively high gain level as compared to neighboring pixel areas 325, 330, 345 and 350. Similarly, pixel area 325 is illustrated as having a relatively high gain level as compared to neighboring pixel areas 330, 335, and 350.

Each pixel element is suitably associated with one or more shift registers. In the illustrated example, the array is rectangular and comprised of multiple rows 360 and multiple columns 370. Once exposure of an image or frame is complete, columns of row 375 are shifted to the right until all pixel values are communicated to an output register 380. Once all values of row 375 are output, rows of the array are suitably shifted down one level so as to allow the next row to be read to output register 380. The process of shifting down, then shifting right, is suitably repeated until values associated with all elements of the array 310 have been placed into the output register 380. This process is suitably repeated for a sequence of captured images (frames) at an acceptable interval corresponding to desired image fidelity characteristics. Generally, higher frame rates result in smoother motion during rendering of a capture image. However, each image captured requires electrical power, which may be problematic in connection with a portable camera operating on batteries.

Next, in FIG. 3, illustrated is a gain conversion component 385 which suitably applies signal levels to input image values. These signal levels are suitably digitized at analog-to-digital converter 390. Digital pixel output 395 suitably outputs pixel values corresponding to a captured image as pixel values 1, 2, ..., n.

Figure 4:
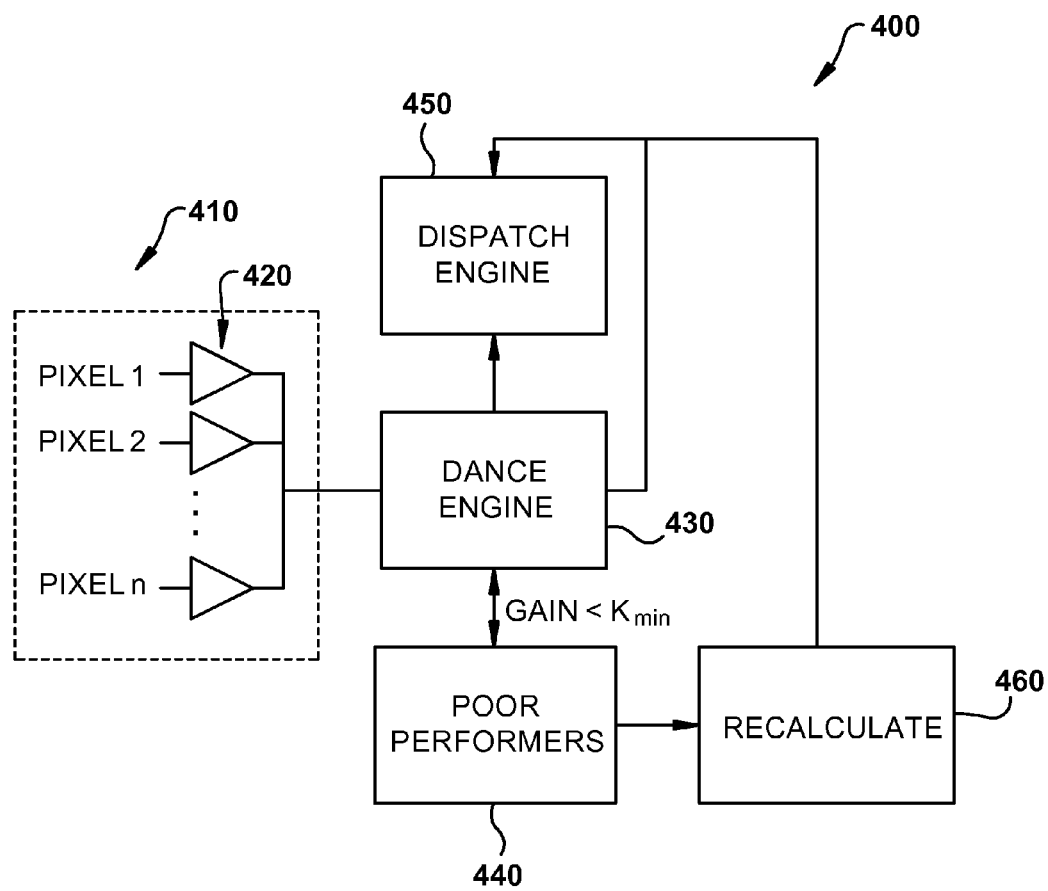
FIG. 4 illustrates an example embodiment of pixel capture optimization.

Referring now to FIG. 4, illustrated is an optimization control 400. An input 410 suitably received pixel data, such as that output in connection with FIG. 3. Amplifiers 420 suitably adjust signal values of incoming pixel information to an acceptable level, and these values are communicated to dance engine 430. Dance engine 430 suitably operates in conjunction with an algorithm such as that defined above. In a particular example embodiment, gain levels associated with pixels, or groupings of pixels, are compared for gain values relative to a threshold value. Threshold values are suitably defined relative to a set value or relative values to neighboring levels of pixels or pixel groups. Relative levels, either as compared within a frame, between adjacent frames, or trends in image evolution, resultant from the analysis suitably communicate or store a subset of pixels 440 that are of relatively low interest to isolate them for a period from subsequent processing or acquisition. Pixels that meet the threshold requirements are suitably communicated to dispatch engine 450 for control of subsequent image capture.

Insofar as data acquisition relative to poor performing or lower gain pixels is ongoing during capture of multiple images or video, suitable recalculation is accomplished relative to the poor performers at 460 allowing for modified selection by dispatch engine 450.

Figure 5:
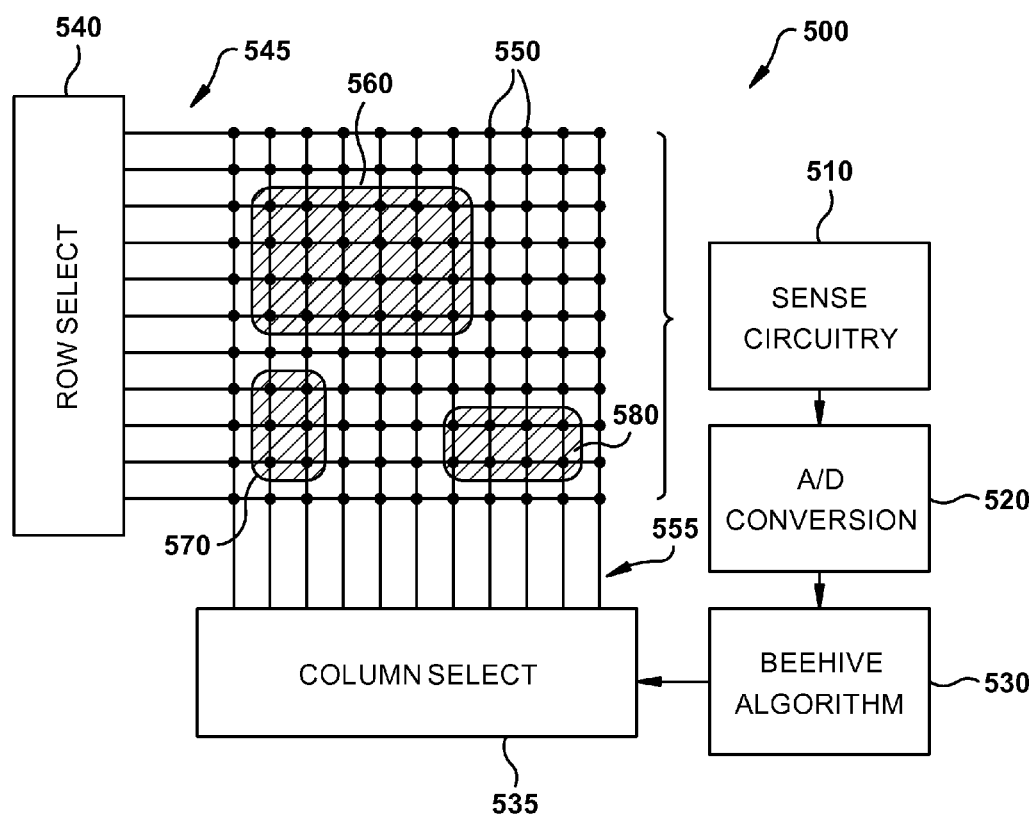
FIG. 5 illustrates an example embodiment of imaging capture control.

Turning next to FIG. 5, illustrated is an example embodiment of an image acquisition optimization system 500. Sense circuitry 510 is suitably as described in conjunction with FIG. 3, and includes analog-to-digital conversion at 520. Application of a beehive algorithm at 530 suitably provides an output to column select 535. In this example embodiment, column select 535 selectively enables one or more of column select lines 555. Application of column select 535 in conjunction with row select 540 operative to selectively enable one or more of row select lines 545. Enabling of particular combinations column select lines 555 and row select lines 545 enables corresponding image acquisition elements 550, suitably in a manner noted above. While control relative to acquisition optimization is illustrated relative to column control, it will be appreciated that row control, or a combination of row and column control, is also suitably implemented.

By way of further example, areas 560, 570 or 580, which have been determined to be areas of interest from the optimization analysis, are suitably enabled for subsequent capture of an image or images. Thus, a smaller number of image acquisition elements are enabled saving on power consumption while still acquiring desired image characteristics. In the case of video capture, it will be appreciated that such selective enabling is suitably used during capture of a large number of frames, thus realizing substantial power savings over time.

Figure 6:
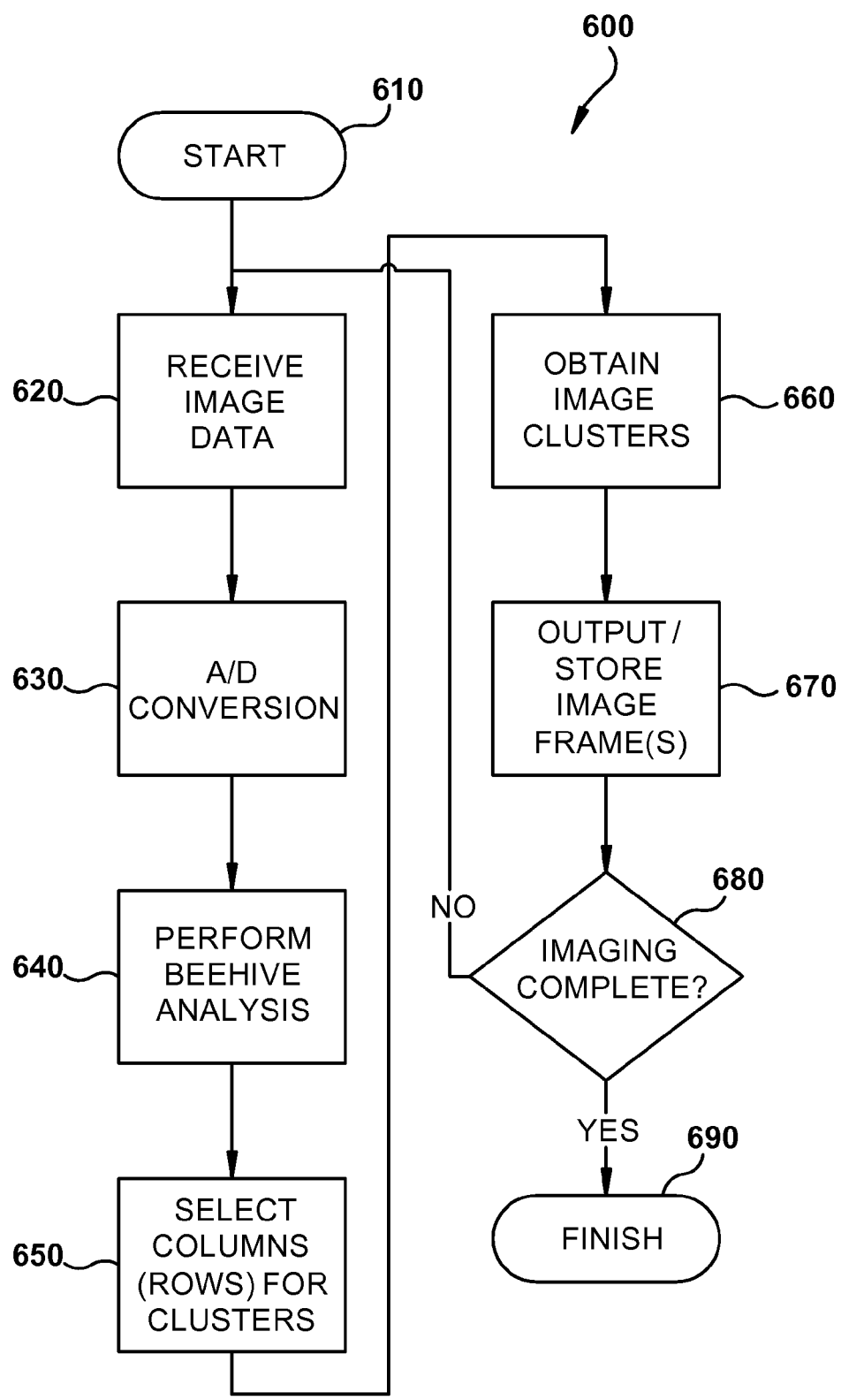
FIG. 6 illustrates flowchart of an example imaging process embodiment.

Referring now to FIG. 6, illustrated is an example embodiment of a flowchart for imaging optimization as detailed above. The process suitably commences at block 610 and proceeds to block 620 wherein image data is acquired. Analog-to-digital conversion is suitably accomplished at 630 and beehive analysis accomplished at 640. Selected rows and/or columns of an imaging array are determined at 650, and corresponding image clusters are obtained at 660. Input images resultant from a controlled image capture is output and/or stored at 670. A determination is made at 680 if an imaging operation is complete. If not, progress is suitably returned to 620 and recommences. Once completed, the operation suitably terminates at 690.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

It is claimed:

1. An apparatus comprising:
    an array of optically reactive elements;
    an array control operable to selectively enable elements of the array;
    an optical input operable to receive an image on to the array;
    wherein each of the reactive elements are operable to generate a signal in accordance with a portion of the image;
    a digitizer operable to generate a digital pixel value corresponding to each signal;
    a memory operable to store the pixel values;
    a selector operable to generate an output in accordance with a comparison of digital values of neighboring pixel and a threshold value;
    wherein the selector is further operable to generate a control signal to selectively enable elements of the array in accordance with groupings of neighboring pixels formed in accordance with the output from the selector.

2. The apparatus of claim 1 wherein the selector is further operable to compare the digital values in accordance with a swarming algorithm.

3. The apparatus of claim 2 wherein the swarming algorithm is further comprised of a beehive algorithm.

4. The apparatus of claim 1 wherein the array is further operable to receive at least one additional image of a sequence of images corresponding to a video capture;
    wherein the selector is further operable to communicate segmented groupings to the memory; and
    wherein the selector is further operable to generate a new control signal in accordance with stored segmented groupings and digital pixel values corresponding to the at least one additional image.

5. The apparatus of claim 4 wherein the digital pixel values comprise a value corresponding to gain.

6. The apparatus of claim 5 wherein the threshold value corresponds to the digital pixel values.

7. The apparatus of claim 6 wherein:
    the array is comprised of a rectangular array of active pixel sensors; and,
    the array control is comprised of a selector of at least one of rows and columns of the array.

8. A method comprising:
    receiving an image onto an array of optically reactive elements;
    generating, via each of the optically reactive elements, a signal in accordance with a portion of the image exposed thereto;
    generating a digital pixel value corresponding to each signal;
    storing the pixel values in an associated memory;
    comparing digital values of neighboring pixels;
    generating an output in accordance with the comparing;
    generating groupings of pixels in accordance with the comparing and a threshold value; and selectively enabling enable elements of the array in accordance with the groupings.

9. The method of claim 8 further comprising generating the output in accordance with a swarming algorithm.

10. The method of claim 8 further comprising generating the output in accordance with a beehive algorithm.

11. The method of claim 8 further comprising:
storing, in the memory, data corresponding to generated pixel groupings;
receiving at least one additional image of a sequence of images corresponding to a video capture onto the array;
generating, via each of the optically reactive elements, a new signal in accordance with a portion of the at least one additional image exposed thereto;
generating new digital pixel values corresponding to each new signal; and
generating new groupings of pixels in accordance with stored groupings and new digital pixel values.

12. The method of claim 11 wherein the digital pixel values comprise a value corresponding to gain.

13. The method of claim 12 wherein the threshold value corresponds to the digital pixel values.

14. The method of claim 13 further comprising selectively enabling elements of the array by selection of at least one of rows and columns of the array.

15. An apparatus comprising:
an array of optically reactive elements;
an array control operable to selectively enable elements of the array;
a shutter;
an optical input operable to receive a sequence of images on to the array in accordance with operation of the shutter;
wherein each of the reactive elements are operable to generate a signal in accordance with a portion of the image;
a digitizer operable to generate a pixel gain value corresponding to each signal;
a memory operable to store the pixel gain values;
a selector operable to generate an output in accordance with a comparison of pixel gain values associated with neighboring elements of the array;
wherein the selector is further operable to segment groupings of pixels having a gain above a threshold value; and
wherein the selector is further operable to generate a control signal to selectively enable elements of the array in accordance with the groupings for acquisition of a subsequent image received on the array.

16. The apparatus of claim 15 wherein the selector is further operable to segment groupings of pixels by iterative comparison of the pixel gain values relative to gain levels of neighboring elements.

17. The apparatus of claim 16 wherein the selector is further operable to narrow a pixel grouping in accordance with the iterative comparison.

18. The apparatus of claim 17 further comprising an input for receiving the threshold value.

19. The apparatus of claim 18 wherein the selector completes the iterative comparison in accordance with preselected criteria.

20. The apparatus of claim 19 wherein the selector completes the iterative comparison in accordance with an image property.

* * * * *